(12) United States Patent
Kleczewski et al.

(10) Patent No.: US 11,319,915 B2
(45) Date of Patent: May 3, 2022

(54) ENGINE SYSTEM, AND METHOD OF STARTING THE ENGINE

(71) Applicant: Kohler Co., Kohler, WI (US)

(72) Inventors: Michael R. Kleczewski, Cleveland, WI (US); Dustin Richards, Plymouth, WI (US)

(73) Assignee: KOHLER CO.

(*) Notice: Subject to any disclaimer, the term of this patent is extended or adjusted under 35 U.S.C. 154(b) by 0 days.

(21) Appl. No.: 17/327,920

(22) Filed: May 24, 2021

(65) Prior Publication Data

US 2021/0388804 A1    Dec. 16, 2021

Related U.S. Application Data (60) Provisional application No. 63/113,625, filed on Nov. 13, 2020, provisional application No. 63/056,403, filed on Jul. 24, 2020, provisional application No. 63/038,061, filed on Jun. 11, 2020.

(51) Int. Cl.
*F02N 11/08*      (2006.01)

(52) U.S. Cl.
CPC ........ *F02N 11/0866* (2013.01); *F02N 11/087* (2013.01); *F02N 2011/0885* (2013.01); *F02N 2011/0892* (2013.01); *F02N 2200/063* (2013.01)

(58) Field of Classification Search
CPC ............... F02N 11/0866; F02N 11/087; F02N 2200/063; F02N 2011/0892; F02N 2011/0885

USPC ........ 123/179.3, 179.4, 179.5, 179.16, 185.3
See application file for complete search history.

(56) References Cited

U.S. PATENT DOCUMENTS

| | | |
|---|---|---|
| 4,223,657 A | 9/1980 | Sato et al. |
| 4,774,624 A | 9/1988 | Qualich |
| 4,949,684 A | 8/1990 | Gohara |
| 5,078,104 A | 1/1992 | Peterson, Jr. |
| 5,157,267 A | 10/1992 | Shirata et al. |
| 5,419,291 A | 5/1995 | Kimata et al. |
| 5,563,454 A | 10/1996 | Araki et al. |
| 5,816,221 A | 10/1998 | Krueger |
| 5,937,829 A | 8/1999 | Endou |
| 5,975,057 A | 11/1999 | Repplinger et al. |
| 6,308,688 B1 | 10/2001 | French et al. |
| 6,374,791 B1 | 4/2002 | Kuwabara et al. |
| 6,557,509 B1 | 5/2003 | Hall et al. |
| 6,679,216 B2 | 1/2004 | Nemoto et al. |

(Continued)

FOREIGN PATENT DOCUMENTS

| | | |
|---|---|---|
| CN | 201386592 | 1/2010 |
| EP | 0646723 | 5/1997 |

(Continued)

*Primary Examiner* — Hai H Huynh
(74) *Attorney, Agent, or Firm* — The Belles Group, P.C.

(57) ABSTRACT

Engine systems which are easier starting and more resistant to degradation and discharge of their batteries are desirable in a wide range of equipment markets. The present engine systems utilize a selection module which selective switches from a first state when the battery is adequately charged to a second state which enables the use of auxiliary components such as special starting stators and regulators which can power the engine control module even when the battery is too discharged to power the engine control module directly.

20 Claims, 5 Drawing Sheets

(56) References Cited

U.S. PATENT DOCUMENTS

| | | | |
|---|---|---|---|
| 6,713,889 B2 * | 3/2004 | Dietz | ................... H02K 3/28 290/40 C |
| 6,718,931 B2 | 4/2004 | Morishige et al. | |
| 6,776,133 B2 | 8/2004 | Tezuka et al. | |
| 6,901,899 B2 | 6/2005 | Tsunoda et al. | |
| 7,069,896 B2 | 7/2006 | Tsunoda et al. | |
| 7,093,577 B2 | 8/2006 | Tohyama | |
| 7,156,064 B2 | 1/2007 | Namari et al. | |
| 7,174,874 B2 | 2/2007 | Horikoshi | |
| 7,191,752 B2 | 3/2007 | Schriever et al. | |
| 7,213,561 B2 | 5/2007 | Hashiba | |
| 7,216,617 B2 | 5/2007 | Tanaka et al. | |
| 7,243,631 B1 | 7/2007 | Ho | |
| 7,325,524 B2 | 2/2008 | Yang | |
| 7,328,100 B2 | 2/2008 | Fukushima et al. | |
| 7,395,794 B2 | 7/2008 | Tamamoto et al. | |
| 7,409,942 B2 | 8/2008 | Hashiba | |
| 7,571,659 B2 | 8/2009 | Horikoshi | |
| 7,621,246 B2 | 11/2009 | Tohyama | |
| 7,650,865 B2 | 1/2010 | Kohls | |
| 7,770,554 B2 | 8/2010 | Chigira et al. | |
| 7,882,817 B2 | 2/2011 | Yamazaki | |
| 7,886,706 B2 | 2/2011 | Grybush | |
| 7,938,092 B2 | 5/2011 | Yang | |
| 8,166,947 B2 | 5/2012 | Hashiba et al. | |
| 8,286,604 B2 | 10/2012 | Kihara et al. | |
| 8,297,250 B2 | 10/2012 | Nieda et al. | |
| 8,487,457 B2 | 7/2013 | Fujisawa et al. | |
| 8,490,594 B2 | 7/2013 | Kitajima | |
| 8,667,942 B2 | 3/2014 | Yang | |
| 9,068,545 B2 | 6/2015 | Gorenflo et al. | |
| 9,145,861 B2 | 9/2015 | Yamazaki et al. | |
| 9,309,854 B2 | 4/2016 | Provost | |
| 9,347,417 B2 | 5/2016 | Shomura et al. | |
| 9,366,218 B2 | 6/2016 | Takeshige et al. | |
| 9,698,621 B2 | 7/2017 | Usselman et al. | |
| 9,797,359 B2 | 10/2017 | Kullberg et al. | |
| 10,247,159 B2 | 4/2019 | Ishiyama et al. | |
| 10,288,030 B2 | 5/2019 | Maki | |
| 10,293,908 B2 | 5/2019 | Noguchi et al. | |
| 10,393,086 B2 | 8/2019 | Koenen et al. | |
| 10,514,014 B2 | 12/2019 | Koenen et al. | |
| 11,131,285 B2 * | 9/2021 | Gibson | ................... H02J 7/342 |
| 2009/0278509 A1 | 11/2009 | Boyles et al. | |
| 2010/0012101 A1 | 1/2010 | Fujinuma et al. | |
| 2014/0366830 A1 | 12/2014 | Kawano et al. | |
| 2014/0375067 A1 | 12/2014 | Yang | |
| 2015/0107542 A1 | 4/2015 | Kyokane et al. | |
| 2018/0313284 A1 | 11/2018 | Geyer et al. | |
| 2019/0242351 A1 | 8/2019 | Matsuyama et al. | |
| 2019/0390621 A1 | 12/2019 | Yamamura | |
| 2020/0124013 A1 | 4/2020 | Koenen et al. | |

FOREIGN PATENT DOCUMENTS

| | | |
|---|---|---|
| EP | 1557561 | 12/2017 |
| EP | 2647829 | 4/2019 |
| JP | H07-103111 | 4/1995 |
| JP | 2007-016647 | 1/2007 |
| JP | 2009-293633 | 12/2009 |
| JP | 2010-168938 | 8/2010 |
| JP | 2013-151863 | 8/2013 |
| KR | 20-0465657 | 3/2013 |
| WO | WO2017/168597 | 10/2017 |
| WO | WO2017/168598 | 10/2017 |
| WO | WO2019/043925 | 3/2019 |
| WO | WO2019/079483 | 4/2019 |

* cited by examiner

ENGINE SYSTEM, AND METHOD OF STARTING THE ENGINE

CROSS-REFERENCE TO RELATED APPLICATIONS

The present application claims the benefit of priority to U.S. Provisional Application No. 63/038,061 filed Jun. 11, 2020, U.S. Provisional Application No. 63/056,403 filed Jul. 24, 2020, and U.S. Provisional Application No. 63/113,625 filed Nov. 13, 2020, which are incorporated herein by reference in their entireties.

BACKGROUND

The present invention generally relates to control systems for internal combustion engines, and more particularly to starting and control systems and related devices or apparatuses for such engines.

Internal combustion engines utilize a variety of methods for delivering fuel and spark. Modern trends are to utilize computer controlled fuel injection and spark control. However, engine control modules which provide control of fuel injection and spark control require electricity in order to operate. When a battery or other energy storage device becomes excessively discharged, it is possible to reach a condition where the energy storage device can no longer provide sufficient electrical energy to operate the engine control module. In such situations, it may be possible to manually rotate the engine to start it, but the engine control module will never deliver fuel or spark if there is insufficient energy in the energy storage device. This is a disadvantage over carbureted systems, which are sometimes able to start even when the energy storage device is extremely discharged. The present disclosure provides ways of enabling engine starting even under deep discharge conditions.

Improvements are desired to enable starting and running of engines having extremely discharged electrical energy storage devices. This beneficially enables successful starting and operation of implements having nearly completely discharged energy storage devices. Equipment reliability is improved, resulting in an improved end-user experience even when the energy storage device is in sub-optimal condition.

SUMMARY

The present application discloses an engine system which enables starting during deep discharge of a battery or other energy storage device. The engine system provides power to an engine control module despite the deep discharge of the energy storage device.

In some implementations, the engine system has an engine control module, the engine control module configured to control at least one of a fuel injector and an ignition coil. The engine system also has a first energy storage device, a first stator, a second stator, and a selection module. The first stator is configured to charge the first energy storage device. The second stator is configured to power a portion of the engine control module. The selection module is configured to transition from a first state to a second state. In the first state, the first energy storage device provides energy to the engine control module. In the second state, the first energy storage device is isolated from the portion of the engine control module.

In other implementations, the engine system has an engine control module, the engine control module configured to control at least one of a fuel injector and an ignition coil. The engine system also has a first energy storage device, a first regulator, a second regulator, and a selection module. The first regulator is configured to charge the first energy storage device. The second regulator is configured to power a portion of the engine control module. The selection module is configured to transition from a first state to a second state. In the first state, the first energy storage device is connected to the engine control module. In the second state, the second regulator is connected to the portion of the engine control module and the first energy storage device is isolated from the portion of the engine control device.

In yet other implementations, a method of starting an internal combustion engine is disclosed. In step a), an engine is provided, the engine having a recoil start assembly, an engine control module configured to control at least one of a fuel injector and an ignition coil, an energy storage device, and a selection module. The selection module is configured to transition from a first state wherein the energy storage device is connected to the engine control module to a second state wherein the energy storage device is isolated from the engine control module, the engine being in a non-running state. In step b), the selection module selects the second state, wherein the first energy storage device is isolated from the engine control module. In step c), the recoil start assembly is operated so that the engine transitions from a non-running state to a running state. In step d), the selection module selects the first state wherein the energy storage device is connected to the engine control module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

All drawings are schematic and not necessarily to scale. Features shown numbered in certain figures which may appear un-numbered in other figures are the same features unless noted otherwise herein.

DETAILED DESCRIPTION

The features and benefits of the invention are illustrated and described herein by reference to non-limiting examples in which aspects of the disclosure may be embodied. This description of examples is intended to be read in connection with the accompanying drawings or photos, which are to be considered part of the entire written description. Accordingly, the disclosure expressly should not be limited to such examples illustrating some possible non-limiting combination of features that may exist alone or in other combinations of features disclosed herein.

In the description of examples disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range.

Figure 1:
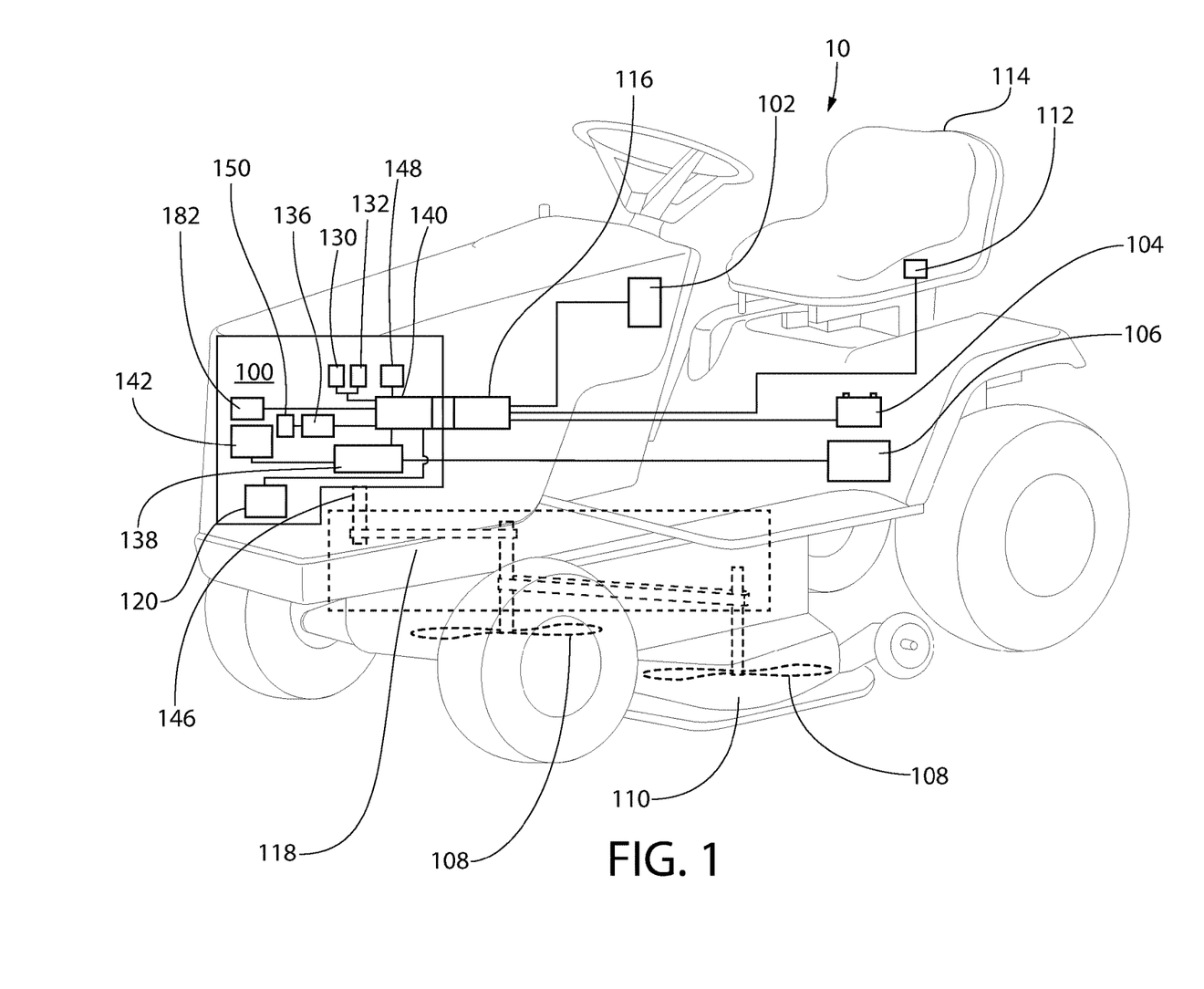
FIG. 1 is a schematic view of a lawn mower utilizing an internal combustion engine according to the present invention.

FIG. 1 shows a perspective view of a riding type lawn mower 10 having an engine 100 which may utilize an engine control system according to the present invention. In the exemplary embodiment, the lawn mower 10 comprises an engine system 100, an ignition switch 102, an energy storage device 104, a fuel supply 106, two cutting blades 108 in a mower deck 110, a safety switch 112, a seat 114, a machine wiring harness 116, and a transmission 118. The engine system 100 includes an engine 120, a first stator 130, a second stator 132, one or more ignition coils 136, one or more spark plugs 150, an engine control module 138, an engine wiring harness 140, a selection module 142, and a fuel air mixer 144.

The engine system 100 may also include a starter motor 148 to start the engine 110 without the need for manual starting. The engine 110 of the engine system 100 has an output shaft 146 which operatively connects to the transmission 118. The transmission 118 provides engine power to the cutting blades 108 and motive power for the lawn mower 10. In some embodiments, the energy storage device 104 may be a battery. In other embodiments, the energy storage device 104 may be a capacitor or other device for storing electrical energy. Under normal operating conditions, the energy storage device 104 provides all electrical energy required to start and run the engine 110 from a non-running state.

The lawn mower 10 of the exemplary embodiment is typically operated by turning the ignition switch 102 to the "on" position, which provides electrical energy from the energy storage device 104 to the engine system 100 via the machine wiring harness 116. This electrical energy is then distributed to the various components of the engine system 100 as required. For instance, the engine control module 138 and the coil 136 would typically be powered when the ignition switch 102 is in the on position. The safety switch 112 is typically deactivated by the operator sitting on the seat 114, allowing starting of the engine. At this time, the ignition switch 102 may be turned to the start position and the engine 110 started. The engine 110 will typically continue to run as long as the fuel supply 106 continues to supply fuel to the engine 110, until the safety switch 112 is activated (ie. altered to a second state), or until the ignition switch 102 is turned to the "off" position. While the engine is running, the first stator 130 is supplying charging current to the energy storage device 104, recharging it for future running cycles of the engine 110.

Figure 2:
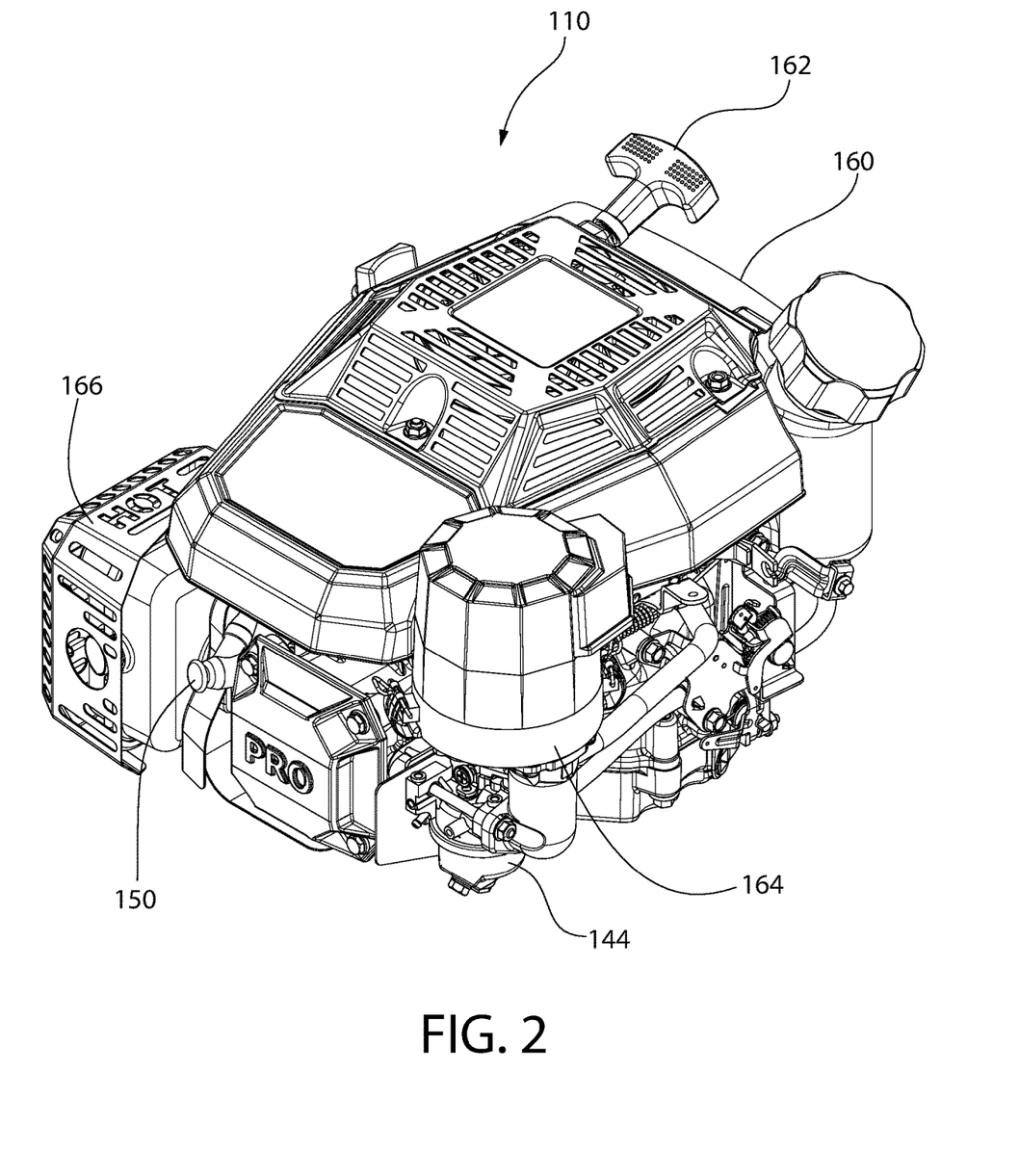
FIG. 2 is a schematic perspective view of a representative internal combustion engine as may be utilized in the lawn mower of FIG. 1.

FIG. 2 shows a representative engine 110 as may be installed in the lawn mower 10 or other engine powered equipment. In this embodiment, the engine 110 comprises a fuel supply 160 mounted directly to the engine 110. However, in some embodiments the engine 110 might utilize a remote-mounted fuel supply such as the fuel supply 106 shown in FIG. 1. The engine 110 further comprises a recoil starter 162, also known as a pull starter. The recoil starter 162 may be used to manually start the engine 110 by pulling on the handle of the recoil starter 162 to manually rotate the crankshaft of the engine 110. The engine 110 has an air intake 164 optionally including an air filter. The engine 110 also has a fuel/air mixing device 144 such as a carburetor or a combination of a fuel injector and a throttle body. A spark plug 150, in combination with an ignition coil, generates the spark required to ignite an air/fuel mixture. The engine 110 also has an exhaust 166 which may comprise a muffler or other sound reduction device. Finally, the engine 110 may optionally have a starter motor 148 which rotates the crankshaft of the engine 110 using electrical energy from the energy storage device 104 instead of mechanical energy provided by the user.

Figure 3:
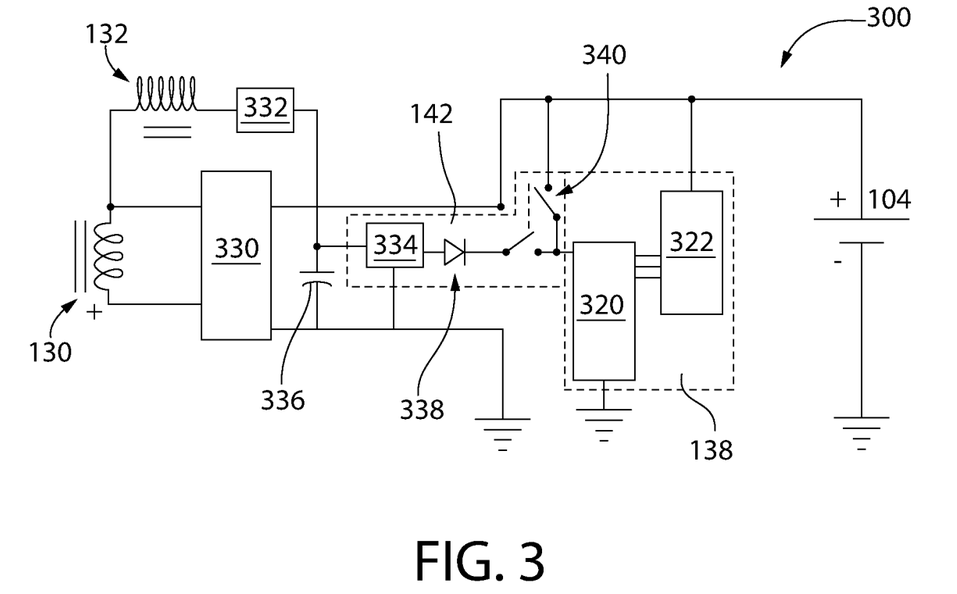
FIG. 3 is a schematic showing a first embodiment of a control system as may be utilized with the engine of FIG. 2.

Turning to FIG. 3, a first embodiment of the engine system 300 is described in greater detail. In this embodiment, the engine system 300 has a selection module 142 shown by a dotted box. The engine control module 138 is also indicated by a dotted box. As can be seen, the system 300 also comprises a first stator 130, a second stator 132, a first regulator 330, a rectifier 332, a second regulator 334, a capacitor 336, a diode 338, and a switch 340. A first energy storage device 104 is also shown, although this may be located externally to the engine system 300. Optionally it may be mounted on the equipment as shown in FIG. 1 instead of being a part of the engine system directly. Regardless of where the first energy storage device 104 is located, it delivers electrical energy to the engine control module during at least one operating mode of the engine system.

The engine system 300 beneficially enables starting and running of the engine 110 under conditions where the first energy storage device 104 is severely discharged. For instance, if the first energy storage device 104 is a lead acid battery of nominally 12 volts, it is nearly fully discharged when its actual voltage is 12.0 volts. A fully charged 12 volt lead acid battery will have an actual voltage of approximately 12.7 volts, while a 50% discharged 12 volt lead acid battery might have an actual voltage of approximately 12.18 volts. A fully discharged 12 volt lead acid battery might have an actual voltage of approximately 10.5 volts. Thus, the actual voltage of a battery may have no correlation with the discharge level of the battery. However, electrical devices such as the engine control module 138 require certain minimum voltages to operate. It is possible that a fully discharged battery may still provide enough energy to run the engine control module 138, but that is not necessarily the case. Even a fully discharged battery has some energy remaining, but it may be insufficient to powerate the engine control module 138. For instance, it may have too low a voltage for the engine control module 138 or the current that the battery can deliver might be too low to permit operation of the engine control module 138. In addition a starter motor 148 requires substantial energy to operate, and will fail to start the engine 110 even if the engine control module 138 is operating from the first energy storage device 104.

The present engine system 300 utilizes the first stator 130 to charge the first energy storage device 104 during normal operating conditions of the engine and ensure that the energy storage device 104 is fully charged before the engine is shut down. The first stator 130 is positioned adjacent a flywheel of the engine 110. The flywheel has a plurality of magnets attached thereto. The first stator 130 has a first winding of wire, the wire having a first diameter. The first winding of the first stator 130 has a first number of turns. The first stator 130 generates a sinusoidal voltage which is induced by the rotating magnetic field of the plurality of magnets on the flywheel of the engine 110 when the engine 110 is running.

The diameter of the wire of the first winding is selected based on the current delivery requirements from the first stator 130 throughout the operating range of the engine 110. The diameter of the wire of the first winding must be large enough to handle the current induced by the magnets on the flywheel at all operating speeds. The number of turns of the first winding is selected to result in a voltage suitable for charging the first energy storage device 104. An increased number of turns of the first winding results in a higher output voltage and a lower output current. Thus, the diameter of the wire and the number of turns of the first winding are selected to deliver a suitable current and voltage for the first energy storage device 104 through the operating range of the engine 110.

The first regulator 330 has a rectifier and may optionally regulate voltage. Thus, the alternating current and voltage from the first stator 130 is regulated into direct current having an exclusively positive voltage as is well understood in the art. One or more capacitors may be used to smooth the voltage and current from the rectifier. The first regulator 330 may also regulate the output of the rectifier to a maximum voltage or current. As can be seen from the schematic, the first regulator 330 is directly coupled to the first energy storage device 104 so that the first energy storage device 104 is charged whenever the engine is running. The first energy storage device 104 is typically charged whenever the output of the first stator 130 and the first regulator 330 have an output voltage greater than the voltage of the energy storage device 104. This is ordinarily true whenever the engine 110 is at idle. The first regulator 330 is directly electrically coupled to the first energy storage device 104 such that the electrical potential of the output of the first regulator 330 is identical to the electrical potential of the first energy storage device 104.

The second stator 132 is also positioned adjacent the flywheel of the engine 110. The second stator 132 has a second winding of wire, the wire having a second diameter. The second diameter of the wire of the second winding is less than the first diameter of the wire of the first winding. The second winding of the second stator 132 has a second number of turns which is greater than the first number of turns of the second stator 132. This ensures that the second stator 132 provides a greater voltage than the first stator 130 at the same speed of the engine 110. The second stator 132 is designed such that useful amounts of energy can be harvested during manual rotation of the engine. When a user pulls the recoil starter 162, the second stator 132 generates an alternating current and voltage which are high enough that they can be used to power some of the electrical components of the system 300. Other manual means of rotation of the engine 110 are also contemplated, with the second stator 132 designed to deliver useful energy at the speeds obtained by manual rotation of the engine 110. The wire diameter and second number of turns of the second winding may be varied to achieve appropriate voltages and currents for the anticipated rotation speeds generated during manual rotation of the engine 110. Optionally, the magnets may be formed of high-grade ceramics or rare earth metals to increase the strength of the magnetic field and increase the energy delivered by the second stator 132.

The second stator 132 is connected to the rectifier 332 so that the alternating currents and voltages are converted into positive-only voltages and currents. The resulting direct currents and voltages are used to charge the capacitor 336. The capacitor 336 may also be referred to as a second energy storage device. Although the storage capacity of the capacitor 336 may be much less than the storage capacity of the first energy storage device 104, it can be charged by manual operation of the pull starter 164 or other manual rotation. The capacitor 336 is sized to permit operation of selected portions of the system 300 such as all or a part of the engine control module 138. The capacitor 336 may be a conventional capacitor, a super capacitor, an ultra-capacitor, a small capacity battery, or any other known energy storage device.

The rectifier 332 and the capacitor 336 are also connected to the second regulator 334. The second regulator 334 regulates the voltage and/or the current from the capacitor 336 and the output of the rectifier 332 such that it is within acceptable levels to operate electrical devices within the system 300. For instance, in a circuit that is operated from a nominally 12 volt lead acid battery, the second regulator 334 might regulate the voltage to be less than 16 volts to avoid damaging the engine control module 138. The output of the second regulator 334 might also be selected so that a minimum acceptable voltage is delivered to the electrical devices within the system 300 to conserve energy harvested by the second stator 132. The first and second regulators 330, 334 may be configured to output the same voltage or different voltages depending on application requirements. Furthermore, the first and second regulators 330, 334 may comprise buck converters, linear regulators, boost converters, buck/boost converters, or other known voltage regulation circuits. Finally, the second regulator 334 may include the rectifier 332 in alternate embodiments. The second regulator 334 may be a part of the switching module 142 or it may be a separate component.

The diode 338 provides reverse voltage protection, ensuring that the output of the second regulator 334 is not powered in reverse in the event of a component malfunction, voltage transient in the system 300, or other undesired event. The diode 338 also serves to prevent overloading the output of the second regulator 334 in the event that the switch 340 does not isolate the first energy storage device 104 from the second regulator 334 for any reason. In some embodiments the diode 338 may be incorporated into the second regulator 334 or may be omitted. The output of the diode 338 is connected to the switch 340 as shown in FIG. 3.

The switch 340 allows selection between the output of the first regulator 330 and the second regulator 334 via a double pole, single throw configuration. The switch 340 is manually operated by the user and couples the output from either the first or second regulator 330, 334 to a first portion 320 of the engine control unit 138. Thus, in a first state the switch 340 allows the first portion 320 of the engine control unit 138 to be powered from the first energy storage device 104 and the first regulator 330. As mentioned above, the first regulator 330 is directly electrically coupled to the first energy storage device 104 such that the electrical potential of the output of the first regulator 330 is identical to the electrical potential of the first energy storage device 104. Therefore, the first state of the switch 340 powers the first portion 320 of the engine control unit 138. The ignition switch 102 may be used to disconnect the engine control unit 138 from the first energy storage device, but is not shown in the schematic of FIG. 3.

In the second state, the switch 340 electrically couples the second regulator 334, via the diode 338, to the first portion 320 of the engine control unit 138. Thus, when the user selects the second state of the switch 340, power is provided from the second stator 132, the rectifier 332, the capacitor 336, and the second regulator 334 instead of from the first energy storage device 104 and the first stator 130 and first regulator 330.

Turning to the engine control unit 138 so that it may be discussed in greater detail, the engine control unit 138 comprises a first portion 320 and a second portion 322. The first portion 320 of the engine control unit 138 typically includes a processor, a memory, and switching circuitry for driving one or more coils 136 and one or more fuel injectors such as may be used in the fuel air mixer 144. The first portion 320 may also include sensing circuitry to detect various temperatures, engine speeds, operator inputs, and any other parameters necessary to operate the engine 110. The second portion 322 may comprise circuitry necessary to operate higher current devices such as fuel pumps, oxygen sensors, oxygen sensor heater coils, and other devices. It is also possible that the switching circuitry for driving the one or more coils 136 and one or more fuel injectors may be part of the second portion 322. As can be seen from FIG. 3, the first portion 320 is connected to the switch 340 while the second portion 322 is directly connected to the first energy storage device 104. Thus, the second portion 322 may be operated from the first energy storage device 104 at all times while the first portion 320 may be operated from either the first energy storage device 104 or the second stator 132 and second regulator 334. In some embodiments, the second portion 322 may be omitted and the engine control unit 138 may be exclusively powered via the switch 340. The ignition switch 102 may be used to cut off both the second portion 322 and the first portion 320 of the engine control module 138 to minimize loss of energy between uses of the equipment.

The switch 340, diode 338, and second regulator 334 form the selection module 142. The selection module 142 may or may not include the diode 338 and the second regulator 334, but will always include the switch 340. The selection module 142 is used for selecting the appropriate source of power for the first portion 320 of the engine control unit 138. As mentioned above, the switch 340 is manually operated by the user. The selection module 142 may further comprise visual indicators such as light emitting diodes or a visual indicator on a screen to inform the user of the current state of the selection module 142. The visual indicators may be triggered when the voltage of the first energy storage device 104 is above or below a cutoff voltage threshold. The visual indicators may also be triggered when a voltage in the capacitor 336 is above or below an activation threshold.

Optionally, the visual indicators may be used to inform the user that the first energy storage device 104 is excessively discharged, when the first energy storage device 104 is sufficiently charged to enable starting, when the capacitor 336 is sufficiently charged to enable starting, or when the capacitor 336 is insufficiently charged to enable starting.

Thus, the activation threshold is driven by the voltage of the capacitor 336 and the cutoff voltage threshold is driven by the voltage of the first energy storage device 104. As noted above, the capacitor 336 may also be referred to as the second energy storage device because it stores energy harvested from the second stator 132 and is used to enable starting.

The selection module 142 transitions between a first state and a second state. In the embodiment of FIG. 3, the first state is selected when the switch 340 is in the first state. The first state of the selection module 142 couples the first energy storage device 104 to the first portion 320 of the engine control module 138. The second state of the selection module is selected when the switch 340 is in the second state. Thus, the second state of the selection module 142 couples the second regulator 334, via the diode 338, to the first portion 320 of the engine control module 138.

In a non-running state of the engine 110 and a first state of the selection module 142, the first energy storage device 104 provides all energy for the first portion 320 of the engine control unit 138. In a running state of the engine 110 and a first state of the selection module 142, the first energy storage device 104 and the first stator 130 collectively provide all energy for the first portion 320 of the engine control unit 138. The exact balance of energy between the first stator 130 and the first energy storage device 104 depends on the amount of energy provided by the first stator 130, which is primarily dependent on the speed of the engine 110. However, in most operating regimes, the first stator 130 charges the first energy storage device 104 and also provides all energy for the engine control unit 138.

At very low engine speeds in the running state of the engine 110, it is possible that the first stator 130 may not provide sufficient energy to charge the first energy storage device 104. The running state of the engine 110 is defined as the speed at which the engine 110 can sustain operation without outside assistance (i.e., idle speed), or any speed above the minimum sustaining speed. The non-running state is defined as any speed below the speed at which the engine 110 can sustain operation without outside assistance. Thus, the engine 110 is in the non-running state when it is stopped or being turned manually or via the starter motor 148 but has not yet accelerated to the minimum sustaining speed.

In a non-running state of the engine 110 and a second state of the selection module 142, the first energy storage device 104 does not provide any energy to the first portion 320 of the engine control unit 138. In the second state of the selection module 142, the first energy storage device 104 is isolated from the first portion 320 of the engine control unit 138 via the switch 340 while the second regulator 334, via the diode 338, is electrically connected to the first portion 320. This prevents the first energy storage device 104 from drawing down the output of the second regulator 334 in the non-running state and preventing energy from being delivered to the first portion 320 of the engine control unit 138.

As will become apparent, there are different starting procedures depending on the state of charge of the first energy storage device 104. In the event of sufficient charge in the first energy storage device 104, it is possible for the user to select the first state of the switch 340, turn the ignition switch to the run position, and activate the starter motor 148 to start the engine 110. As noted above, the first state of the switch 340 corresponds to the first state of the selection module 142. The engine control unit 138 receives adequate energy from the first energy storage device 104 and is able to deliver spark and/or fuel to the engine 110 during starting. The engine 110 then starts and transitions from a non-running state to a running state. In an alternate configuration where the starter motor 148 is not present, the user manually operates the recoil starter 162 and the engine starts, transitioning from a non-running state to a running state. One or more visual indicators may indicate that the state of charge of the first energy storage device 104 is above a first cutoff voltage threshold where both the starter motor 148 and the engine control unit 138 may be operated.

In the event that the first energy storage device 104 has an insufficient state of charge to operate the starter motor 148 but sufficient charge to operate the engine control unit 138, it is possible to start the engine by selecting the first state of the switch 340, turn the ignition switch to the run position, and manually operate the recoil starter 162. As noted above, the first state of the switch 340 corresponds to the first state of the selection module 142. The engine control unit 138 will deliver spark and/or fuel to the engine 110 during starting. The engine 110 then starts and transitions from a non-running state to a running state. One or more visual indicators may indicate that the state of charge of the first energy storage device 104 is below a first cutoff voltage threshold where the starter motor 148 may be operated but above a second cutoff voltage threshold where the engine control unit 138 may be operated. In some implementations the first and second cutoff voltage thresholds may be the same voltage. In other implementations, the first and second cutoff voltage thresholds may be different. In yet further implementations, the first cutoff voltage threshold may be lower than the second cutoff voltage threshold. This may be the case if the starter motor 148 is capable of operation at a lower voltage than the engine control unit 138.

In the event that the first energy storage device 104 has an insufficient state of charge to operate the engine control unit 138, the user may select the second state of the switch 340. As noted above, the second state of the switch 340 corresponds to the second state of the selection module 142. The capacitor 336 is most likely discharged due to current consumption from the regulator 334 and other sources of charge loss. As a result, it is generally not possible to immediately power the engine control unit 138 upon selection of the second state of the switch 340. However, the user may manually operate the recoil starter 162. This creates relative motion between the flywheel of the engine 110 and the second stator 132. As discussed previously, the second stator 132 generates alternating current and voltage that the rectifier 332 rectifies into direct current and voltage. The direct current and voltage from the rectifier 332 charges the capacitor 336. After one or more pulls of the recoil starter 162, the capacitor 336 is charged to a voltage sufficient to power the engine control unit 138. Optionally, a visual indicator may indicate that the activation threshold for the engine control unit 138 has been reached.

The activation threshold may be a voltage equal to the minimum voltage required to power the first portion 320 of the engine control unit 138 or a voltage above the minimum voltage required to power the first portion 320 of the engine control unit 138. The activation threshold and the charge capacity of the capacitor 336 may be selected to achieve a specific operating time for the engine control unit 138. Optionally, the charge capacity of the capacitor 336 may be optimized to deliver sufficient operating time for the engine control unit 138 to permit an additional operation of the recoil starter 162 while minimizing the number of operations of the recoil starter 162 required to charge the capacitor 336. As is apparent, the number of operations of the recoil starter 162 is ideally minimized so optimization of the system 300 is of primary importance.

Upon successful powering of the first portion 320 of the engine control unit 138 or the entirety of the engine control unit 138 from the capacitor 336 and a successful operation of the recoil starter 162 subsequent to achieving the activation threshold for the engine control unit 138, the engine 110 will start. The engine 110 then transitions from a non-running state to a running state.

As is apparent, the engine control unit 138 may be divided into portions which are separately powered by the capacitor 336 and the first energy storage device 104 in order to further reduce the energy that must be harvested by the second stator 132 and stored in the capacitor 336. However, this relies on adequate energy remaining in the first energy storage device 104 to operate the second portion 322 of the engine control unit 138. As a result, it may be desirable to power an entirety of the engine control unit 138 from the capacitor 336 via the selection module 142 instead of just the first portion 320.

When the engine 110 is in the running state and the selection module 142 is in the second state, the stator 132 charges the capacitor 336 and the regulator 334 continues to deliver energy to the engine control unit 138. Meanwhile, the first stator 130 continues to deliver energy to the first energy storage device 104 via the first regulator 330. Because the energy requirements on the first energy storage device 104 are minimized, the first energy storage device 104 rapidly recharges.

The selection module 142 may monitor the state of charge of the first energy storage device 104 and visual indicators of the selection module 142 may indicate to the user that the switch 340 may be transitioned to the first state. This indication may occur in response to the first energy storage device 104 reaching one or both of the first and second cutoff voltage thresholds. The user may then transition the switch 340 to the first state and normal operation may resume. The output of the second regulator 334 is then disconnected from the first portion of the engine control unit 138 and the capacitor 336 is charged, but no further demands upon the capacitor 336 or the second regulator 334 are made until the engine 110 returns to a non-running state.

Figure 4:
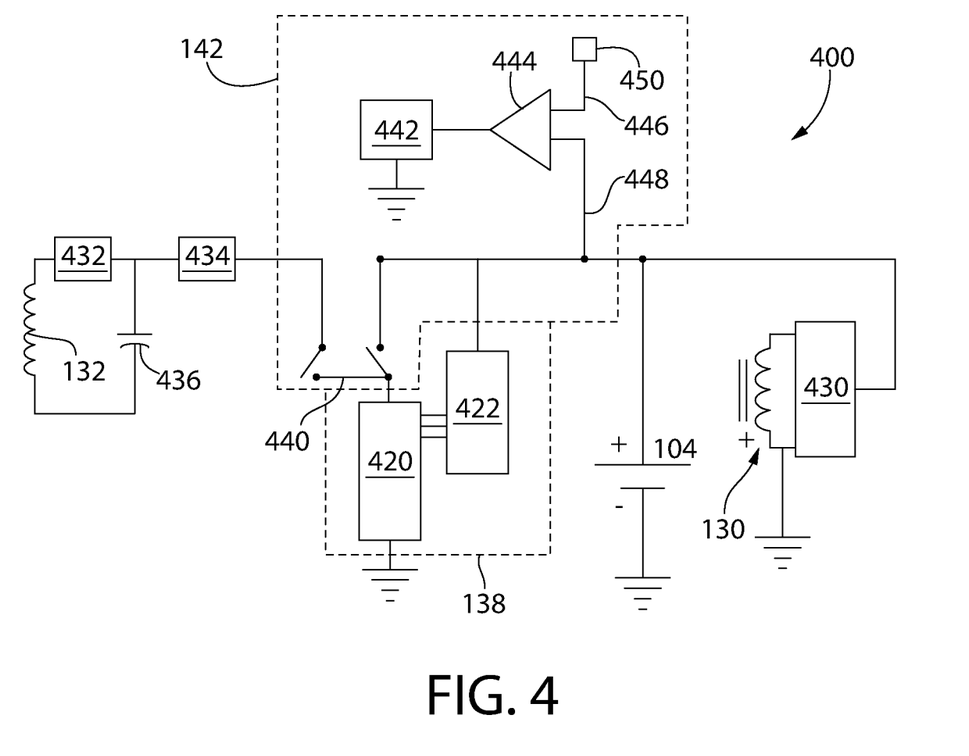
FIG. 4 is a schematic showing a second embodiment of a control system as may be utilized with the engine of FIG. 2.

Turning to FIG. 4, a second implementation of the system is shown. The system 400 is identical to the system of FIG. 3 with the exception of the aspects discussed below. In the system 400, the first stator 130 is coupled to a first regulator 430, with the output of the first regulator 430 being directly connected to the first energy storage device 104. The system 400 also comprises the second stator 132, a rectifier 432, a capacitor 436 (alternately referred to as a second energy storage device), a second regulator 434, the engine control module 138, and the selection module 142. In the system 400, the engine control module 138 comprises a first portion 420 and a second portion 422. The selection module 142 of the system 400 differs from the implementation of FIG. 3.

The selection module 142 of FIG. 4 comprises a relay, the relay having an electromagnet 442 and a plurality of contacts 440. The selection module 142 also comprises a voltage reference 450 and a comparator 444 having a reference input 446 and a monitor input 448. Instead of a user operated switch, the comparator 444, reference input 446, monitor input 448, voltage reference 450, and relay serve to perform automatic switching between the first state and the second state of the selection module. The voltage reference 450 is selected to be equal to a desired cutoff voltage threshold. The monitor input 448 is connected to the first energy storage device 104 so that it can monitor the voltage of the first energy storage device 104. When the reference input 446 of the comparator 444 is less than the monitor input 448, the comparator 444 does not activate the electromagnet 442 of the relay. The normally closed contact of the plurality of contacts 440 of the relay is connected to the first energy storage device 104 and the common contact of the plurality of contacts 440 is connected to the first portion 420 of the engine control module 138 is powered from the first energy storage device 104. Thus, the default condition for the relay is to power the first portion 420 engine control module 138 from the battery. When the selection module 142 is in the first state, the relay is in the default condition, with the normally closed contact of the plurality of contacts 440 being closed.

When the reference input 446 of the comparator 444 is greater than the monitor input 448, the comparator 444 activates the electromagnet 442 of the relay. This results in the normally open contact of the plurality of contacts 440 closing with respect to the common contact and the normally closed contact of the plurality of contacts 440 opening with respect to the common contact. The output of the second regulator 434 is now electrically connected to the first portion 420 of the engine control module 138, delivering power to the first portion 420 of the engine control module 138 so long as there is sufficient charge in the capacitor 436. The first energy storage device 104 is isolated from the first portion 420 of the engine control module 138. Thus, the selection module 142 is in the second state, the relay is in the active condition, with the normally open contact of the plurality of contacts 440 being closed with respect to the common contact and the normally open contact of the plurality of contacts 440 being open with respect to the common contact.

However, it is conceived that the opposite configuration might be utilized, with the output of the second regulator 434 connected to the normally open contact and the first energy storage device 104 connected to the normally closed contact. In that case, the comparator inputs might be reversed so that the electromagnet 442 of the relay is activated when the monitor input 448 of the comparator 444 is greater than the monitor input 446. The first state of the selection module 142 would still result in the first energy storage device 104 powering the first portion 420 of the engine control module 138. The second state of the selection module 142 would still result in the capacitor 436 and second regulator 434 powering the first portion 420 of the engine control module 138. As can be seen, the exact configuration of the circuit may vary so long as a reference input is used to control the switchover between states in the selection module. Visual indicators may or may not be used, but no manual input is required in the system 400. Instead, the user merely needs to operate the recoil starter 162 until the engine transitions from a non-running state to a running state. The selection module 142 automatically returns to the first state once the first energy storage device 104 has charged above the threshold set by the voltage reference 450.

Figure 5:
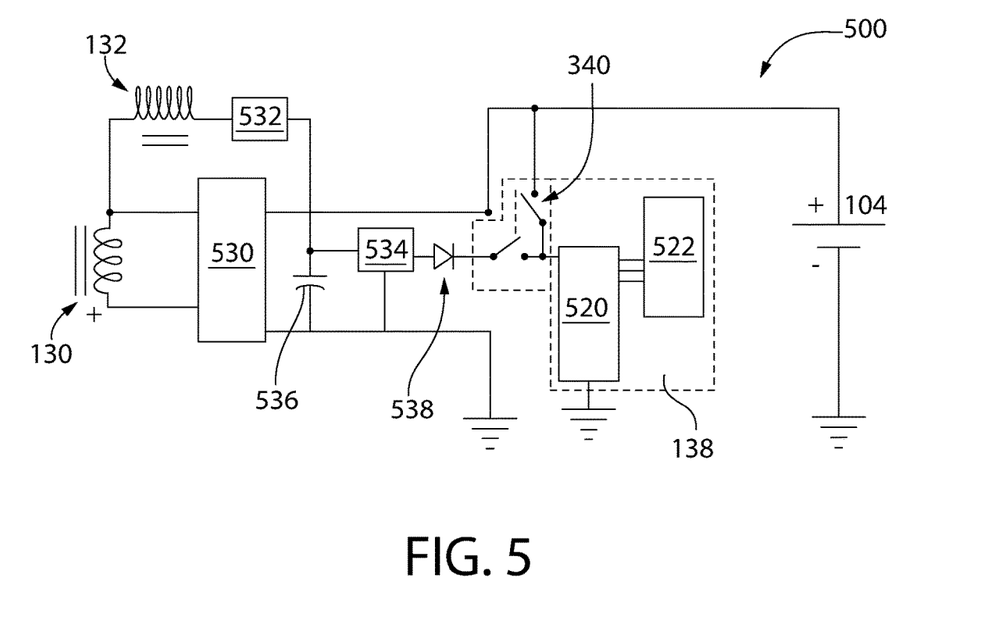
FIG. 5 is a schematic showing a third embodiment of a control system as may be utilized with the engine of FIG. 2.

Turning to FIG. 5, a system 500 is shown. The system 500 is largely identical to the system 300 of FIG. 3, except that the engine control module 138 is exclusively powered via the selection module 142. Thus, both the first portion 520 and the second portion 522 of the engine control module 138 are powered from the same source. When the selection module 142 is in the first state, the switch 540 is in the first state and the first energy storage device 104 provides power to the entirety of the engine control module 138. When the selection module 142 is in the second state, the switch 540 is in the second state and the entirety of the engine control module 138 is powered from the capacitor 536 via the second regulator 534 and the diode 538. The first stator 130, second stator 132, first regulator 530, and rectifier 532 are substantially identical to those of the system 300.

Figure 6:
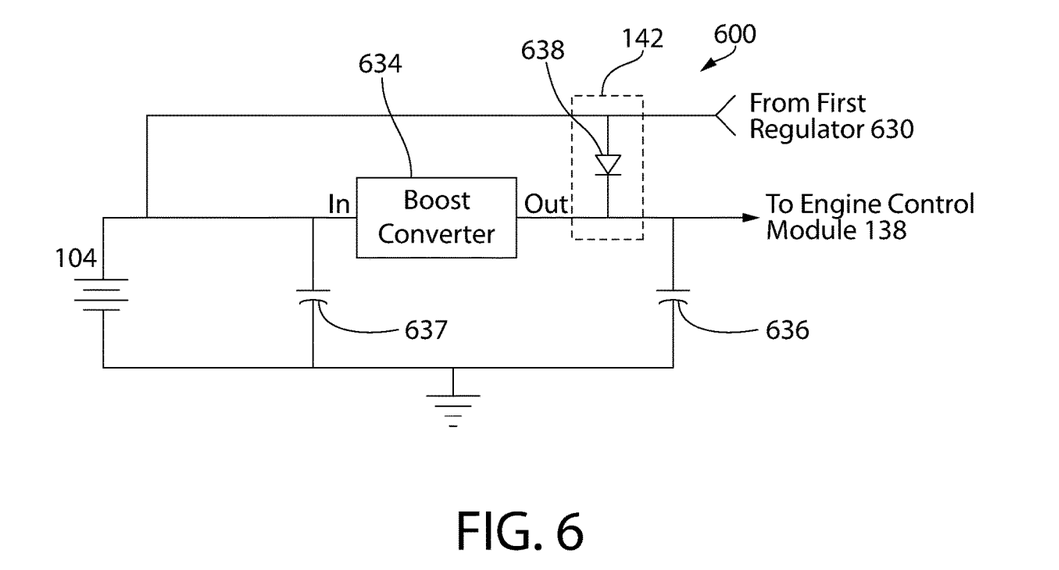
FIG. 6 is a schematic showing a fourth embodiment of a control system as may be utilized with the engine of FIG. 2.

FIG. 6 shows another implementation of the system. The system 600 has a boost converter 634, a first capacitor 636, a second capacitor 637, a first electrical storage device 104, a diode 638, and a first regulator 630. Not shown is the first stator 130, which is configured identically to the previous embodiments. The engine control module 138 is not shown, but is configured identically to the previous embodiments and receives power as indicated in FIG. 6.

As can be seen, the system 600 omits the second stator 132 and utilizes a boost converter for the second regulator 634. This configuration scavenges even very low states of charge within the first electrical storage device 104 to deliver enough energy to the engine control module 138 to enable manual starting using the recoil starter 162. While it is not capable of harvesting energy from manual operation of the recoil starter 162, it does offer the advantage of reduced mechanical complexity because no additional stator is required.

When the engine 110 is in a non-running state, the first energy storage device 104 provides energy to the selection module 142. The selection module 142 comprises the diode 638. The first regulator 630 does not provide energy to the first energy storage device 104 because the engine 110 is in the non-running state. However, the output of the first regulator 630 is directly connected to the first energy storage device 104 and is configured to charge the first energy storage device 104 when the engine 110 is in a running state, just as discussed above. The second regulator 634, which is a boost converter as mentioned above, also draws energy from the first energy storage device 104. The second regulator 634 operates regardless of whether the engine 110 is in a running state or a non-running state. The output of the second regulator 634 charges the first capacitor 636, providing regulated energy to the engine control module 138. The second regulator 634 has a predetermined output voltage, which is the maximum voltage that the first capacitor 636 can be charged to assuming no current draw from the engine control module 138.

When the voltage of the first energy storage device 104 minus the voltage drop of the diode 638 is greater than the voltage of the first capacitor 636, the selection module 142 is in the first state and current flows through the diode 638 to power the engine control module 138. When the voltage of the first energy storage device 104 minus the voltage drop of the diode 638 is less than the voltage of the first capacitor 636, the selection module 142 is in the second state. In the second state, no current flows through the diode 638 and the engine control module 138 is powered from the first capacitor 636. In a preferred embodiment the output voltage of the second regulator 634 is 14 volts in a system utilizing a first energy storage device 104 that is nominally 12 volts. However, the second regulator 634 may output any voltage between 9 and 16 volts or any other voltage suitable for operation of the engine electronics. Typically the voltage output from the first regulator 630 varies between 13.5 volts and 15.0 volts to maintain charge on a nominally 12 volt lead acid battery. It is conceived that during certain operating modes of the engine 110, the selection module 142 may still be in the second state even when the engine 110 is in a running state.

Beneficially, the selection module 142 automatically switches from the first state to the second state without the need for an external voltage reference, a comparator, or even a relay. Alternate circuit configurations are contemplated to enable automatic switching between states.

The second capacitor 637 is connected in parallel with the first energy storage device 104 to ensure a stable supply of energy to the second regulator 634. Optionally, both the first and second capacitors 636, 637 may be ultracapacitors, ultracapacitor banks, or other energy storage devices such as small batteries. However, in a preferred embodiment, the second capacitor 637 is 2 Farads (F) while the first capacitor is 660 milliFarads (mF). The values of the first and second capacitors 636, 637 may be altered to deliver better input stability to the second regulator 634 and to deliver greater operating time for the engine control module 138 while in the non-running state. Preferably, the current delivery of the second regulator 634 is less than the current consumption for the engine control module 138 when the engine control module 138 is operating. This allows reduced cost components to be used for the second regulator 634, reduces circuit size, and minimizes thermal dissipation requirements for the second regulator 634. Visual indicators may be utilized to let the user know when the first capacitor 636 has been sufficiently charged. This ensures that a pull start attempt on the recoil starter 162 will not be futile. However, this is an optional feature that may be omitted.

The second regulator 634 is configured to draw power from the first energy storage device 104 even in deep discharge states. Most importantly, the first energy storage device 104 may have a voltage far below what is required to operate the engine control module 138. The first energy storage device 104 may have a voltage as low as, for example, 6 volts despite being a nominally 12 volt battery. Even 6 volts may be sufficient for the second regulator 634 to draw power and charge the first capacitor 636 to a voltage suitable for operating the engine control module 138. Thus, the second regulator 634 may be able to utilize energy from a fully discharged or even damaged battery to provide enough energy to start the engine 110. The stator 130 can then deliver the energy required to charge the first energy storage device 104 to a level suitable for future starting. In the event that a start attempt is unsuccessful and the first capacitor 636 becomes discharged, the second regulator 634 can recharge the first capacitor 636 after a delay time.

In an alternate configuration, a small auxiliary battery may be temporarily connected to the input of the second regulator 634 to enable charging of the first capacitor 636 even when the first energy storage device 104 is below the minimum level required to operate the second regulator 634. This auxiliary battery may be removed after successful starting. The auxiliary battery is generally not sufficient to operate the starter motor 148, but is intended to provide enough energy to enable the second regulator 634 to charge the capacitor 636 and power the engine control module 138. However, in certain implementations the auxiliary battery may be sufficient to power the starter motor 148.

An added feature of the diode 638 of the selection module 142 is that it ensures that the second regulator 634 does not attempt to charge the first energy storage device 104. Absent a diode 638 or other isolation, the second regulator 634 would merely serve to drain the first energy storage device 104 due to the conservation of energy.

Figure 7:
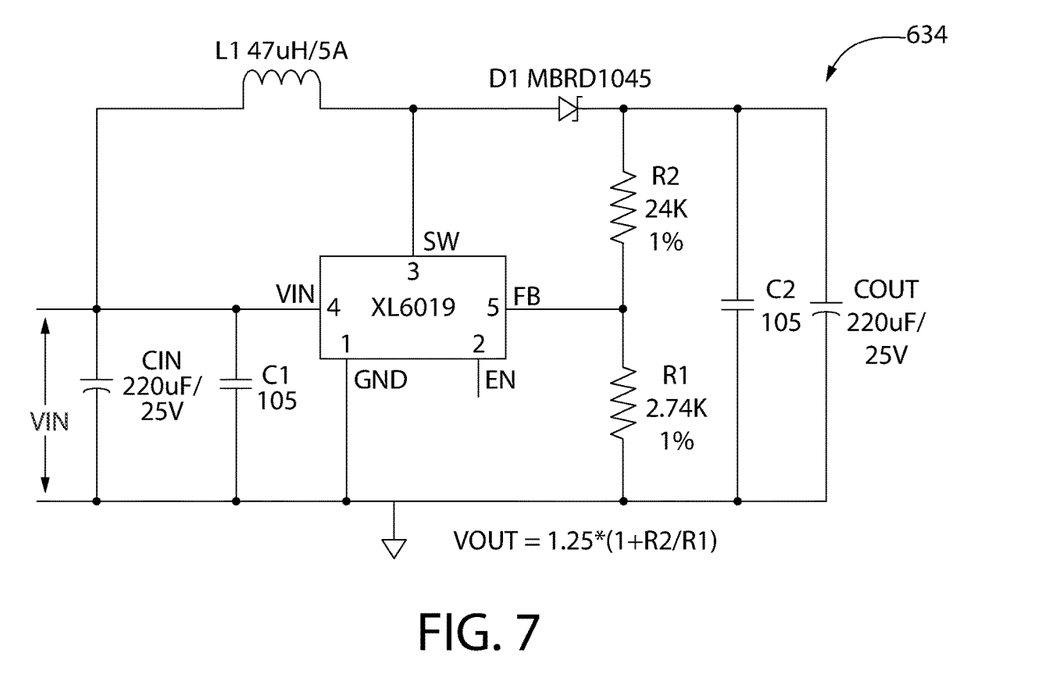
FIG. 7 is a schematic showing a sample circuit as may be utilized in the boost converter of FIG. 6.

Turning to FIG. 7, a typical application circuit for a boost converter is shown such as the second regulator 634. Exemplary component values and their preferred arrangements are shown for the XL6019 buck/boost regulator integrated circuit manufactured by XL Semi.

Figure 8:
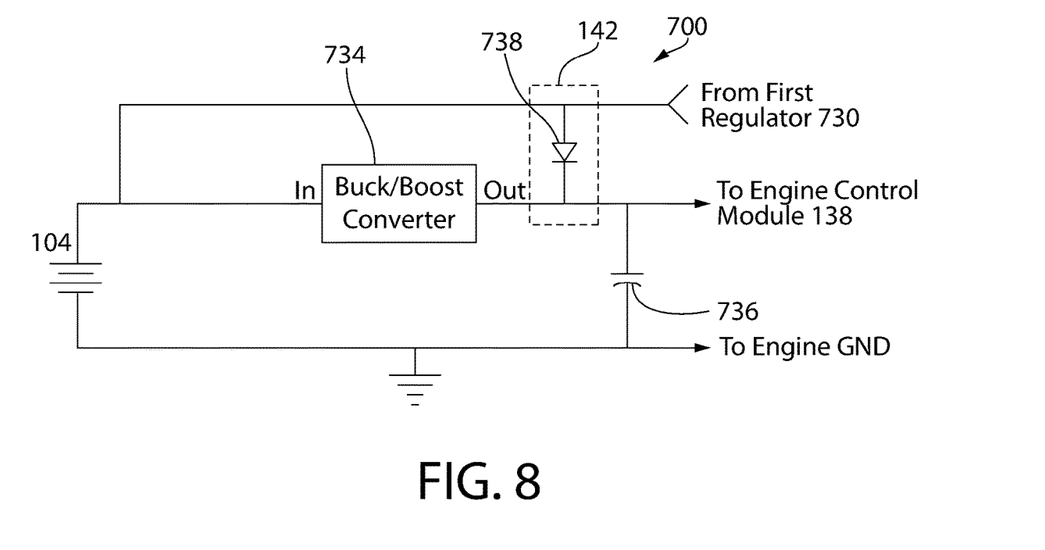
FIG. 8 is a schematic showing a fifth embodiment of a control system as may be utilized with the engine of FIG. 2.

Turning to FIG. 8, yet another system is shown. The system 700 has a first energy storage device 104, a first regulator 730, a second regulator 734, a selection module 142 comprising a diode 738, and a capacitor 736. The system 700 of FIG. 8 is substantially identical to the system 600 of FIG. 6 except that the second capacitor has been omitted. Where the first energy storage device 104 delivers sufficient current even when fully discharged, the second regulator 734 can operate successfully without an additional capacitor on the input. Furthermore, the second regulator 734 is a buck/boost type converter. Thus, the second regulator 734 is capable of not only delivering an increased output voltage as compared with the input voltage, but also delivering a decreased output voltage as compared with the input voltage. This provides increased flexibility in selecting the desired output voltage for powering the engine control module 138.

Further ways of reducing energy consumption have also been considered to facilitate faster starting, reduced effort in manual starting, and start the engine 110 with less energy in the first energy storage device 104. For instance, modified starting strategies may be implemented to further conserve energy when starting the engine in the second state of the selection module 142. The dwell time of a fuel pump or the ignition coil may be reduced to conserve energy and minimize current requirements when battery voltage is below a minimum threshold. This beneficially enhances the probability of starting when the selection module 142 is in the second state. Finally, the engine control module 138 may incorporate the selection module 142 and perform the switching operation between the first state and the second state. This beneficially simplifies the required circuitry.

While the foregoing description and drawings represent examples of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed examples are therefore to be considered in all respects as illustrative and not restrictive, the scope of the invention being defined by the appended claims and equivalents thereof, and not limited to the foregoing description or examples. Rather, the appended claims should be construed broadly, to include other variants of the invention, which may be made by those skilled in the art without departing from the scope and range of equivalents of the invention.

What is claimed is:

1. An engine system comprising:
    an engine control module, the engine control module configured to control at least one of a fuel injector and an ignition coil;
    a first energy storage device;
    a first stator configured to charge the first energy storage device;
    a second stator configured to power a portion of the engine control module;

a selection module configured to transition from a first state wherein the first energy storage device provides energy to the engine control module to a second state wherein the first energy storage device is isolated from the portion of the engine control module.

2. The system according to claim 1 wherein when in the second state, an entirety of the engine control module is isolated from the first energy storage device.

3. The system according to claim 1 wherein when in the second state, the second stator provides energy to the engine control module.

4. The system according to claim 1 wherein the first stator comprises a winding formed of a first wire and the second stator comprises a winding formed of a second wire, wherein the winding of the first stator has a first number of turns and the winding of the second stator has a second number of turns, the second number of turns being greater than the first number of turns, and wherein the first wire has a first diameter and the second wire has a second diameter, the first diameter being greater than the second diameter.

5. The system according to claim 1 wherein the selection module transitions from the second state to the first state in response to the first energy storage device reaching a predetermined voltage threshold.

6. The system according to claim 1 wherein the selection module transitions from the second state to the first state in response to an input from an operator.

7. The system according to claim 1 further comprising a first regulator to regulate the output voltage of the first stator.

8. The system according to claim 1 further comprising a second regulator to regulate the output voltage of the second stator and wherein the second regulator is a boost type regulator.

9. The system according to claim 1 wherein the engine control module comprises a second portion that is powered from the first energy storage device when the selection module is in both the first state and the second state.

10. The system according to claim 1 further comprising a recoil start assembly, an engine, and a starter motor.

11. The system according to claim 10 wherein when the engine is in a non-running state and the first energy storage device has a voltage that is above a cutoff voltage threshold, the selection module is in the first state.

12. The system according to claim 10 wherein when the engine is in a non-running state and the first energy storage device has a voltage that is below a cutoff voltage threshold, the selection module is in the second state.

13. An engine system comprising:
 an engine control module, the engine control module configured to control at least one of a fuel injector and an ignition coil;
 a first energy storage device;
 a first regulator configured to charge the first energy storage device;
 a second regulator configured to power a portion of the engine control module;
 a selection module configured to transition from a first state wherein the first energy storage device is connected to the engine control module to a second state wherein the second regulator is connected to the portion of the engine control module and the first energy storage device is isolated from the portion of the engine control device.

14. The system according to claim 13 wherein when in the second state, an entirety of the engine control module is isolated from the first energy storage device.

15. The system according to claim 13 wherein the selection module transitions from the second state to the first state in response to the first energy storage device reaching a predetermined voltage threshold.

16. The system according to claim 13 wherein the selection module transitions from the second state to the first state in response to an input from an operator.

17. The system according to claim 13 further comprising a first stator configured to deliver energy to the first regulator.

18. The system according to claim 13 further comprising a second stator configured to deliver energy to the second regulator.

19. A method of starting an internal combustion engine comprising:
 a) providing an engine having a recoil start assembly, an engine control module configured to control at least one of a fuel injector and an ignition coil, an energy storage device, and a selection module configured to transition from a first state wherein the energy storage device is connected to the engine control module to a second state wherein the energy storage device is isolated from the engine control module, the engine being in a non-running state;
 b) selecting, via the selection module, the second state wherein the first energy storage device is isolated from the engine control module;
 c) operating the recoil start assembly so that the engine transitions from a non-running state to a running state;
 d) selecting, via the selection module, the first state wherein the energy storage device is connected to the engine control module.

20. The method of claim 19 wherein step b) occurs when a voltage of the first energy storage device is below a cutoff voltage threshold.

* * * * *